July 30, 1963 L. W. SCHOPPEE ETAL 3,099,375
GUM BREAKING DEVICE
Filed Oct. 7, 1960 2 Sheets-Sheet 1
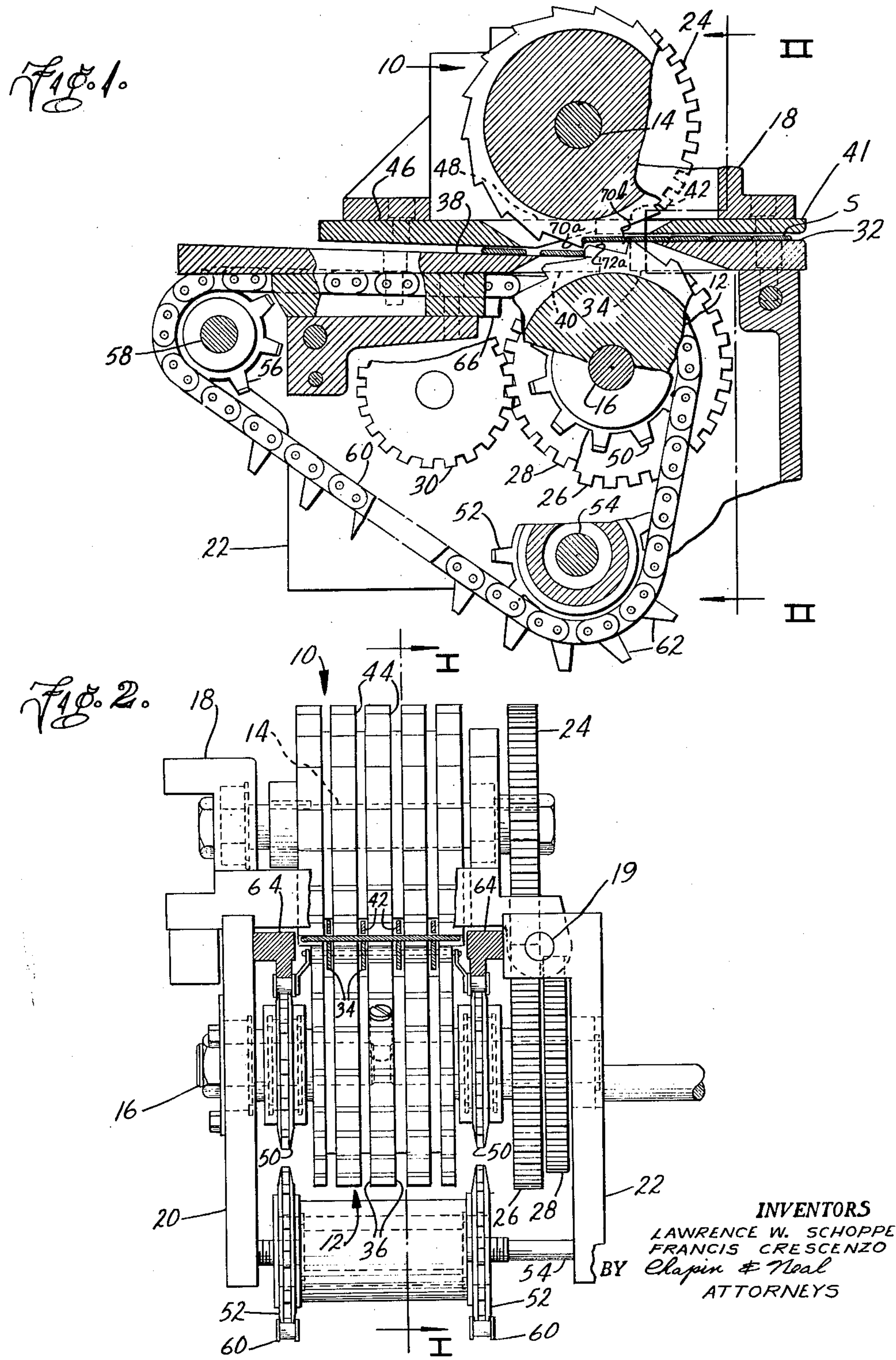

GUM BREAKING DEVICE

Filed Oct. 7, 1960

INVENTORS
LAWRENCE W. SCHOPPEE
FRANCIS CRESCENZO
BY Chapin & Neal
ATTORNEYS

United States Patent Office 3,099,375

Patented July 30, 1963

3,099,375

GUM BREAKING DEVICE

Lawrence W. Schoppee and Francis Crescenzo, Springfield, Mass., assignors to Package Machinery Company, East Longmeadow, Mass., a corporation of Massachusetts Filed Oct. 7, 1960, Ser. No. 61,175
2 Claims. (Cl. 225—97)

The present invention relates to improvements in the art of gum breaking and more particularly to an improved device for separating individual sticks of gum from a slab of gum which has been scored to define the sticks.

The device of the present invention is an improvement over what is disclosed in U.S. Patents Nos. 2,453,805—Melhorn and 2,251,172—Smith et al.

The object of the invention is to provide a gum breaking device capable of operating at higher rates and with greater reliability than has hitherto been attainable.

The need for such an improved device arises, at least indirectly, from the increasingly difficult and competitive problem of maintaining the present price of the ordinary five stick pack of chewing gum. One area in which savings can be made is in combining the gum breaking operation with the wrapping operation. If this is done, the gum breaking device must be extremely reliable and approach 100% in efficiency, otherwise the savings from combining operations will be more than offset by lost production time. This is better appreciated from the fact that the overall efficiency of two units in combination is the multiplication product of their individual efficiencies. The difficulty in obtaining near perfect efficiency is further complicated by improvements which now enable wrapping machines to operate at rates in the range of 1200–1500 sticks per minute.

Another problem overcome in accordance with the objects of the invention is that of attaining rapid rates of operation in breaking relatively thin (about .070 in.) slabs of gum into individual sticks. This problem is particularly difficult because of the near plastic condition of the gum at the time it is to be separated and wrapped.

The gum breaking device of the invention is characterized by a pair of toothed wheels rotating at a constant or uniform rate. One of the wheels is disposed above the other and has the trailing faces of its teeth substantially radially disposed. The leading faces of the teeth on the lower teeth wheel are substantially radially disposed and the teeth of each have a pitch just less than the distance between scores on gum slabs which are to be fed thereto. The teeth of the two wheels at least approximate an interdigitating condition so that scored slabs of gum fed into the bite between said wheels will be broken or separated as a tooth on the lower wheel supports the slab of gum just behind the score line and a tooth on the upper wheel strikes the upper surface of said slab just ahead of said score line. The leading stick of gum is thus separated and may then be carried ahead of the wheels in spaced relation to successive sticks of gum for automatic presentation to wrapping instrumentalities.

The above and other related objects and features of the invention will be apparent from a reading of the following description of the disclosure found in the accompanying drawings and the novelty thereof pointed out in the appended claims.

In the drawings:

FIG. 1 is an elevation of a gum breaking device embodying the present invention and taken substantially on line I—I in FIG. 2;

FIG. 2 is a section taken generally on line II—II in FIG. 1; and

Figure 3:
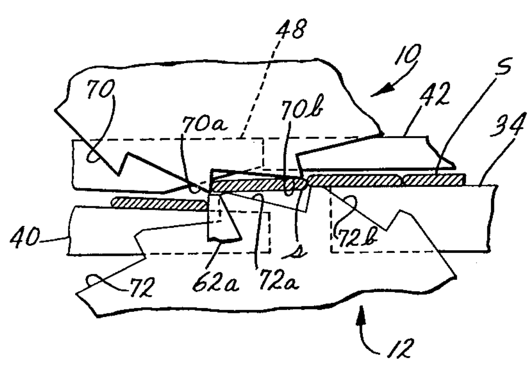
FIGS. 3, 4, 5 and 6 are fragmentary views showing the progressive action of breaker wheels seen in FIG. 1.

The device seen in FIG. 1 comprises an upper breaker wheel 10 and a lower breaker wheel 12 which are respectively secured to shafts 14 and 16. The shaft 14 is journaled in a frame 18 which is mounted for rotation about the axis of pin 19 in a known manner. This enables the wheel 10 to be swung away from the wheel 12 to facilitate repairs or clearing of a jam. The shaft 16 is journaled on frame plates 20, 22.

Meshing gears 24, 26 of equal size are respectively secured to shafts 14, 16 so that the wheels 10 and 12 will rotate at the same rate. Gear 28 is also secured to the shaft 16 and meshes with a gear 30 which is driven at a constant or uniform rate and in predetermined timed relationship with the elements of a wrapping machine where the device is associated with a wrapping machine.

A platform 32 supports scored slabs of gum, as the slab S which are continuously urged towards the wheels 10 and 12 by a slipping conveyor drive of known construction. The level of the platform 32 is substantially the same as the upper extent of the teeth on the rotating lower wheel. The platform 32 has a plurality of fingers 34 which project into grooves 36 formed in the wheel 12 so as to support the gum until it is almost over the axis of the wheel 12. It will be seen that the axis of the wheel 12 is spaced outwardly from the end of the fingers 34 and that the axis of the wheel 10 is spaced outwardly a greater distance. A second or discharge platform 38 has fingers 40 projecting into the grooves 36 and is spaced below the platform 32. The platforms 32 and 38 are both mounted in fixed relation on the frame plate 22.

A hold down plate 41 overlies the platform 32 and has fingers 42 projecting into grooves 44 formed in the upper wheel 10. A second hold down plate 46 overlies the discharge platform 38 and has fingers 48 also projecting into the grooves 44. The hold down plates 41 and 46 are secured to the frame 18 and are swingable with the wheel 10 to provide accesses to the platforms 32 and 38.

A pair of sprockets 50 are rotatably mounted on the shaft 16. A second pair of sprockets 52 are rotatably mounted on a shaft 54 which spans the plates 20, 22. A third pair of sprockets 56 are secured to a shaft 58 which is journaled on the plates 20, 22. The shaft 58 is driven, by means not shown, in timed relationship to the rotation of the wheels 10 and 12 as will later be more fully apparent. A pair of chains 60 are respectively trained about the pairs of sprockets 50, 52 and 56. The chains 60 have matched lugs 62 which carry sticks of gum away from the wheels 10, 12 as will later appear. The upper flights of the chains 60 are confined by upper guides 64 (FIG. 2) and lower guides 66 (FIG. 1) so as to insure a minimum of relative movement between the pushers 62 and separated sticks of gum and thus a smooth, trouble-free action in advancing the individual sticks of gum.

The illustrated devices show the discharge platform 38 and the upper flights of chains 60 on an angle. This arrangement is merely for the convenience of elevating the separated sticks of gum back to the level of the infeed platform 32, for subsequent feeding to the wrapping instrumentalities.

The separating action of the breaker wheels 10 and 12 may best be understood by referring to FIGS. 3–6 in addition to FIG. 1. The individual teeth on the wheel 10 are identified by reference characters 70, while the teeth on the lower wheel 12 are identified by reference characters 72. The trailing faces of the teeth 70 are formed substantially on a radius from the wheel 10, while the leading faces of the teeth 72 are formed substantially on a radius from the center of wheel 12. The pitch between the teeth 70 and the pitch between the teeth 72 is just slightly less than the distance between scores defining individual sticks of gum in the slabs S, as can best be seen in FIG. 3.

In FIG. 1 the leading edge of the scored slab S is yieldingly urged against the trailing face of the tooth 70*a*, it being remembered that the slab S is at all times yieldingly urged towards the wheels 10 and 12. At this time the leading end of the slab of gum is supported solely by the tooth 72*a*. Under these conditions the leading face of the next successive tooth 70*b* on the upper wheel is spaced above the infeed platform 32 a distance approximating the thickness of the gum and is parallel thereto. As the wheels 10 and 12 rotate, the leading stick of gum defined on the slab S will be separated from the slab by the upper face of the gum being engaged by substantially the entire leading face of the tooth 70*b* (see also FIG. 2). This action can best be appreciated from FIG. 3 wherein it will be seen that the tooth 72*a* has dropped away slightly as the point of the tooth 70*b* has almost completed the separation of a single stick *s* from the slab S.

During the separating action, the leading end of slab S is spaced beyond the infeed platform fingers 34 (FIGS. 3 and 4) and is supported by the tooth 72*b* which engages the slab just behind the score line defining the separated, or almost separated, stick *s*. Preferably, the teeth 72 are provided with small lands which provide an area contact with the slab S so as not to unduly mark the slab during the breaking operation.

Figure 4:
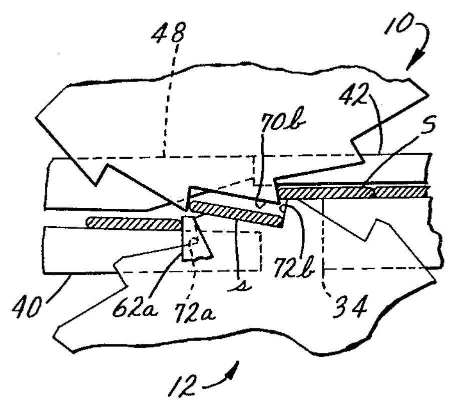
Figure 5:
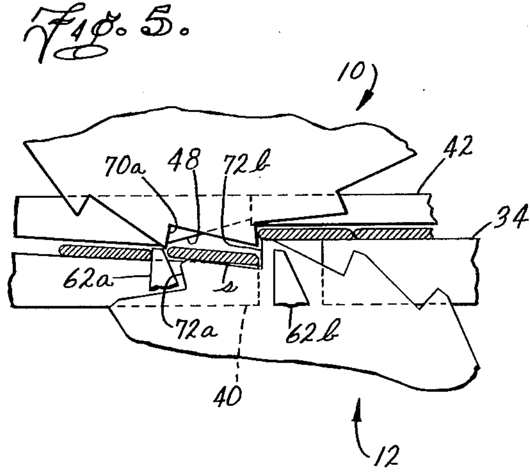
Figure 6:
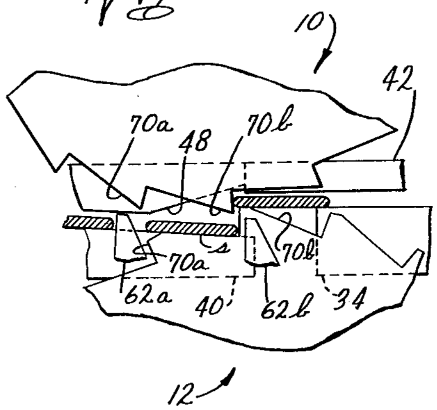

In FIG. 4 it will be seen that the stick *s* is now fully separated from the slab S. Between the positions of FIGS. 3 and 4 the leading end of the slab S is raised slightly so as to insure engagement of its leading edge with the trailing face of the tooth 70*b*. The separated stick *s* lies on the trailing face of the tooth 72*a*. Should there be any tendency for the separated stick to cling to the leading face of the tooth 70*b* or the trailing face of the tooth 70*a*, the fingers 48 of the top plate 46 are beveled to positively separate the separated stick *s* from the wheel 10 and thereby maintain the stick *s* in a controlled path. The separated sticks are to be advanced along the discharge platform 38 (and fingers 40 thereof) by the conveyor lugs 62. It will be noted that the separated stick *s* (FIG. 3) is actually over the conveyor lug 62*a* which is advancing a previously separated stick of gum. The stick *s* thus may actually fall on the lugs 62*a* when separated from the slab S. However, these lugs will advance beyond the separated stick *s* without any ill effect. The stick *s* is actually advanced along the discharge platform by the succeeding conveyor lugs 62*b*, as can best be appreciated in the next showing in FIG. 5. The separated stick *s* has now been almost fully lowered by the tooth 62*a* onto the fingers 40 of the discharge platform 38 and the conveyor lugs 62 are now advancing and will soon engage the trailing edge of the stick *s*. FIG. 6 shows the stick *s* completely lowered onto the fingers, the lug 62*b* actually engaging the stick *s* with the wheels 10 and 12 being rotated to bring the next successive teeth 70 and 72 almost to the positions illustrated in FIG. 1.

The described gum breaking device is highly effective because of the substantially uniform motions of both the breaker mechanism and the gum itself. Further, the controls or supports for the gum have been found highly effective in avoiding any jams due to the extremely soft or plastic condition of the gum at the time of the breaking operation. In this connection it will be noted (see particularly FIG. 6) that the teeth 70, 72 interdigitate but do not actually make contact.

Having thus described the invention what is claimed as novel and desired to be secured by Letters Patent of the United States is:

1. A gum breaking device for separating scored slabs of gum into individual sticks, said device comprising an upper and a lower toothed wheel, the pitch of the teeth on the upper wheel being the same as the pitch of the teeth on the lower wheel, and the pitch of the teeth on both wheels being slightly less than the distance between the scores on the slabs, the major diameters of said wheels being the same, means for rotating both of said wheels in opposite directions at the same rate whereby their peripheral rates will be the same, the trailing faces of the teeth on the upper wheel being disposed substantially radially thereof, the leading faces of the teeth on the lower wheel also being disposed substantially radially thereof, said wheels rotating about parallel axes with their teeth in meshing relation, the trailing faces of the upper teeth and the leading faces of the lower teeth being successively brought into closely adjacent relation as the teeth are rotated into said meshing relation, and a platform leading to the infeed bite of said wheels and along which scored slabs of gum are urged with the scores transverse to their path of advance, said lower wheels having circumferential grooves, said platform being substantially at the level of the upper extent of travel of the teeth on the lower wheel and having extensions projecting into said slots to support the leading end of the slab of gum, said extensions terminating short of a vertical plane through the axis of the lower wheel, whereby support of a stick of gum being broken from the slab will be transferred from the platform to a tooth on the lower wheel moving at the same peripheral rate as the slab of gum.

2. A gum breaking device for separating scored slabs of gum into individual sticks, said device comprising an upper and a lower toothed wheel, the pitch of the teeth on the upper wheel being the same as the pitch of the teeth on the lower wheel, and the pitch of the teeth on both wheels being slightly less than the distance between the scores on the slab, the major diameters of said wheels being the same, means for rotating both of said wheels in opposite directions at the same rate whereby their peripheral rates will be the same, the trailing faces of the teeth on the upper wheel being disposed substantially radially thereof, the leading faces of the teeth on the lower wheel also being disposed substantially radially thereof, said wheels rotating about parallel axes with their teeth at least approximating a meshing relation, the trailing faces of the upper teeth and the leading faces of the lower teeth being successively brought into closely adjacent relation as the teeth are rotated into said meshing relation and a platform leading to the infeed bite of said wheels and along which scored slabs of gum are urged with the scores transverse to their path of advance, said lower wheels having circumferential grooves, said platform being substantially at the level of the upper extent of travel of the teeth on the lower wheel and having extensions projecting into said slots to support the leading end of the slab of gum, said extensions terminating short of a vertical plane through the axis of the lower wheel and the axis of the upper wheel being longitudinally offset from the axis of the lower wheel toward the discharge side of said wheels whereby the leading end of the slab of gum will first be supported by the platform extensions and then by a tooth on the lower wheel moving at the same peripheral speed as the gum and supporting the slab as an individual stick is sheared therefrom by a tooth on the upper wheel.

References Cited in the file of this patent

UNITED STATES PATENTS

| | | |
|---|---|---|
| 2,224,430 | Garbutt | Dec. 19, 1940 |
| 2,251,172 | Smith et al. | July 29, 1941 |
| 2,453,805 | Melhorn | Nov. 16, 1948 |
| 2,652,788 | Schoppee | Sept. 22, 1953 |